US006538561B2

(12) United States Patent
Angus

(10) Patent No.: US 6,538,561 B2
(45) Date of Patent: Mar. 25, 2003

(54) DATA COMMUNICATION NETWORK FOR MINIMIZING TOLL-CHARGE DEPENDENT LINKS AND METHOD OF OPERATION

(75) Inventor: Allan D. Angus, Bedford, TX (US)

(73) Assignee: WebLink Wireless, Inc., Dallas, TX (US)

(*) Notice: Subject to any disclaimer, the term of this patent is extended or adjusted under 35 U.S.C. 154(b) by 0 days.

(21) Appl. No.: 09/224,432

(22) Filed: Dec. 31, 1998

(65) Prior Publication Data

US 2002/0080008 A1 Jun. 27, 2002

(51) Int. Cl.[7] .................................................. H04Q 1/00
(52) U.S. Cl. .................... 340/7.21; 340/7.24; 340/7.25; 340/7.27; 340/7.28; 455/12.1; 455/13.2; 455/13.4; 455/575
(58) Field of Search .................... 340/825.44, 7.21, 340/7.24, 7.25, 7.26, 7.27, 7.28; 455/12.1, 13.2, 13.4, 38.3, 574, 575, 428; 370/238

(56) References Cited

U.S. PATENT DOCUMENTS

| | | | |
|---|---|---|---|
| 5,539,392 A | | 7/1996 | Hays et al. ............ 340/825.44 |
| 5,659,298 A | | 8/1997 | Brooks et al. ......... 340/825.44 |
| 5,663,715 A | | 9/1997 | Godoroia .................. 340/825.2 |
| 5,930,681 A | * | 7/1999 | Snowden et al. .......... 455/13.4 |
| 5,930,708 A | * | 7/1999 | Stewart et al. .............. 455/428 |
| 5,949,766 A | * | 9/1999 | Ibanez-Meier et al. ..... 370/316 |
| 6,070,050 A | * | 5/2000 | Penny, Jr. .................. 455/12.1 |
| 6,240,072 B1 | * | 3/2001 | Lo et al. ..................... 370/316 |

* cited by examiner

Primary Examiner—Michael Horabik
Assistant Examiner—Yves Dalencourt

(57) ABSTRACT

There is disclosed an inbound message receiving system for use in a wireless messaging system. The inbound message receiving system comprises: 1) a source base transceiver station capable of receiving a wireless message from a source mobile station disposed in a coverage area of the base transceiver station; and 2) a first satellite transceiver coupled to the base transceiver station and capable of transmitting the wireless message to a satellite. The use of a satellite uplink that is closely associated with the base transceiver station allows all wireless messages to be relayed directly to a central message processor without requiring the wireless messages to be transported via long-distance lines or other toll-charge bearing communication lines.

20 Claims, 3 Drawing Sheets

DATA COMMUNICATION NETWORK FOR MINIMIZING TOLL-CHARGE DEPENDENT LINKS AND METHOD OF OPERATION

TECHNICAL FIELD OF THE INVENTION

The present invention is directed, in general, to wireless communication systems and methods of operating the same and, in particular, to a wireless communications system that reduces or eliminates long distance links that are subject to toll charges.

BACKGROUND OF THE INVENTION

The demand for better and cheaper wireless telecommunication services and equipment continues to grow at a rapid pace. Part of this demand includes wireless message paging devices, which have become ubiquitous in society. Traditional one-way message paging devices (or "beepers") are giving way to newer two-way message paging devices. Additionally, the types of messages that may be send to a beeper have expanded from short telephone number messages to longer length alphanumeric messages and even to voice messages. In some systems, wireless messages may comprise an alphanumeric or voice message to which an electronic file, such as a text document, may be attached.

Much of this growth resulted from the Federal Communication Commission's ("FCC") approval of certain frequency bands for the next generation of Personal Communication Service ("PCS") devices that provide voice telephone service as well as advanced voice and/or data message paging services. A relatively small portion of the available spectrum was set aside for narrowband PCS, which is more suited to advanced message paging services, to encourage efficient use of the available spectrum.

The infrastructure of message paging systems includes a substantial amount of wired backbone that interconnects base transceiver stations to a central hub that routes wireless messages to final destinations. For example, a group of base transceiver stations operated by a wireless messaging service provider in New York City may be wired by local network connections to a regional terminal owned by the wireless messaging service provider and located in the New York City area. The regional terminals may then be linked to a central terminal ("hub") in some other location (e.g., Chicago or Atlanta) by means of long distance lines. The central hub contains databases that may be used to direct wireless messages to target devices around the country.

From the central hub, the wireless messages are transmitted on an uplink to a satellite and are re-transmitted on a downlink to base transceiver stations across the country. Thus, a two-way pager may send a wireless message to a first base transceiver station in New York City and the wireless message may be sent via satellite to a second base transceiver station in Miami, where it is re-transmitted locally to a target wireless messaging device.

One significant drawback to the above-described architecture is the requirement for a large amount of network interface equipment that connects the hundreds or even thousands of base transceiver stations to the long-distance networks. This significantly increases the costs associated with building the wireless network infrastructure.

Another significant drawback is its reliance on long-distance lines to carry wireless message traffic to the central hub. Since all, or nearly all, wireless messages are transported by long-distance lines, long-distance charges (or tolls) make up a significant portion of the operating costs of the wireless messaging network. This results in higher monthly service fees to subscribers of the wireless service provider.

Wireless message devices that are "roaming" are particularly susceptible to long-distance charges. In normal operations, a wireless message sent to a subscriber is directed to a message server in the "home" area in which the subscriber normally resides. However, when a subscriber turns on his pager in a remote (or "roaming") area, the pager registers with a message server in the roaming area. The roaming area message server sends a notification to the subscriber's home area message server, which then re-directs all new messages that it receives to the roaming area message server. The roaming area message server then delivers the wireless messages by transmission from base transceiver stations in the roaming area.

Thus, if a source message pager sends a wireless message to a target message pager that is roaming in the same coverage area, the wireless message first must be sent to the home area of the target message pager and then must be re-directed to the coverage area in which both the source and target message pagers are located. This may result in long-distance toll charges in both directions.

Therefore, there exists a need in the art for an improved wireless messaging system that does not require a large amount of network interface equipment to connect base transceiver stations to long-distance networks. There exists a further need for a wireless messaging system that minimizes the number of toll charges incurred by using long-distance lines in the delivery of wireless messages.

SUMMARY OF THE INVENTION

The limitations inherent in the prior art described above are overcome by means of an inbound message receiving system for use in a wireless messaging system. The inbound message receiving system comprises: 1) a source base transceiver station capable of receiving a wireless message from a source mobile station disposed in a coverage area of the base transceiver station; and 2) a first satellite transceiver coupled to the base transceiver station and capable of transmitting the wireless message to a satellite.

According to one embodiment of the present invention, the satellite is a geosynchronous satellite. Alternatively, the satellite may comprise one or more of the following: low-earth orbit satellite(s), plane(s) flying at high altitude above a defined coverage area, high-altitude balloon(s), high-altitude blimp(s), and the like.

According to another embodiment of the present invention, the inbound message receiving system further comprises a second satellite transceiver capable of receiving from the satellite the wireless message.

According to still another embodiment of the present invention, the inbound message receiving system further comprises a message server coupled to the second satellite transceiver and capable of processing the wireless message and determining therefrom at least one target base transceiver station associated with a target mobile station to which the wireless message is directed.

According to yet another embodiment of the present invention, the mobile station is an alphanumeric paging device.

According to a further embodiment of the present invention, the mobile station is a telemetry device capable of two-way paging.

According to a still further embodiment of the present invention, the inbound message receiving system further comprises a local communication link for coupling the source base transceiver station to the first satellite transceiver and transferring the wireless message, wherein the local communication link does not include a portion that is part of a long-distance network subject to long-distance fees.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, wherein like numbers designate like objects and in which.

DETAILED DESCRIPTION

Figure 1:
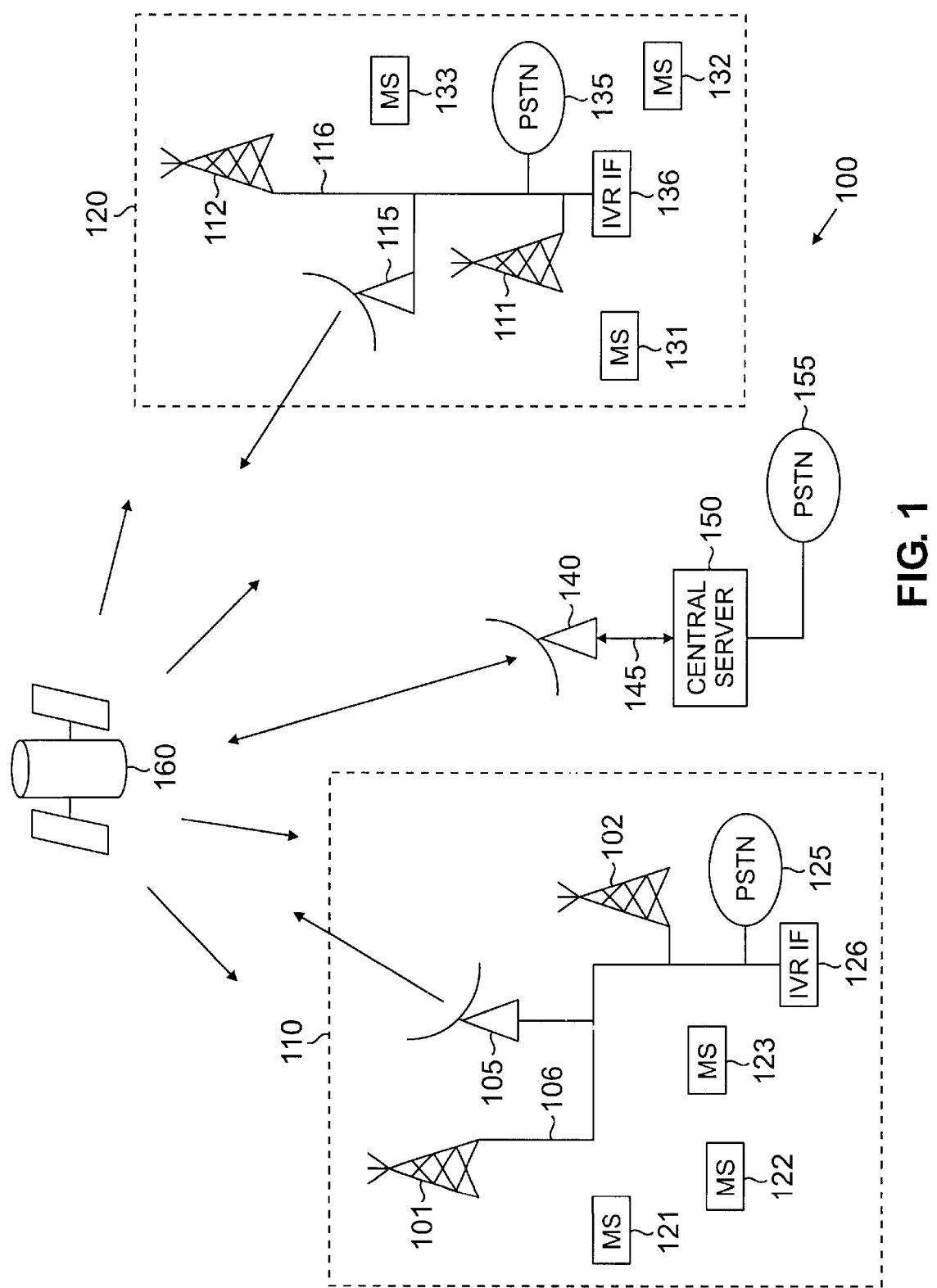
FIG. 1 illustrates an exemplary wireless network according to one embodiment of the present invention.
Figure 2:
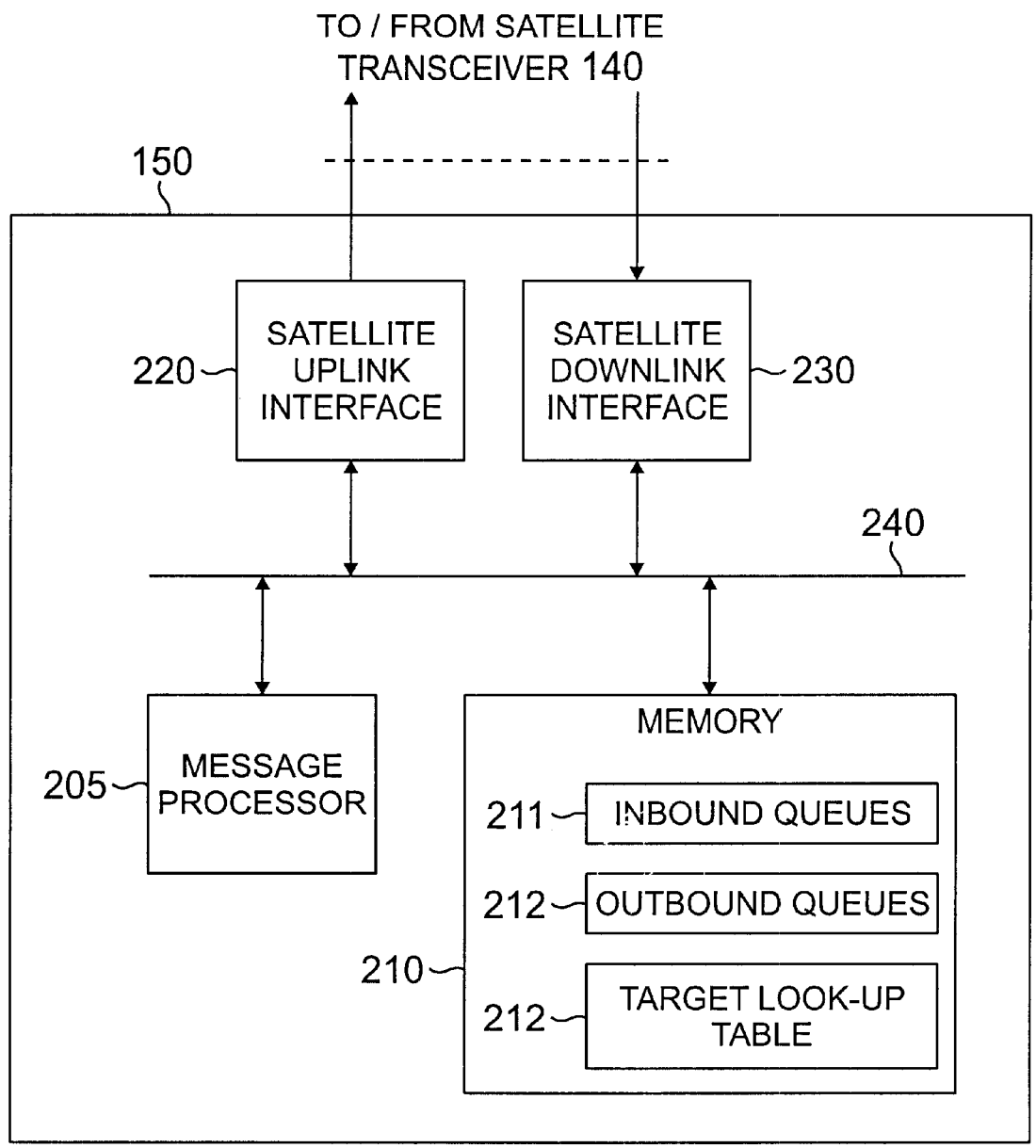
FIG. 2 illustrates central server according to one embodiment of the present invention.
Figure 3:
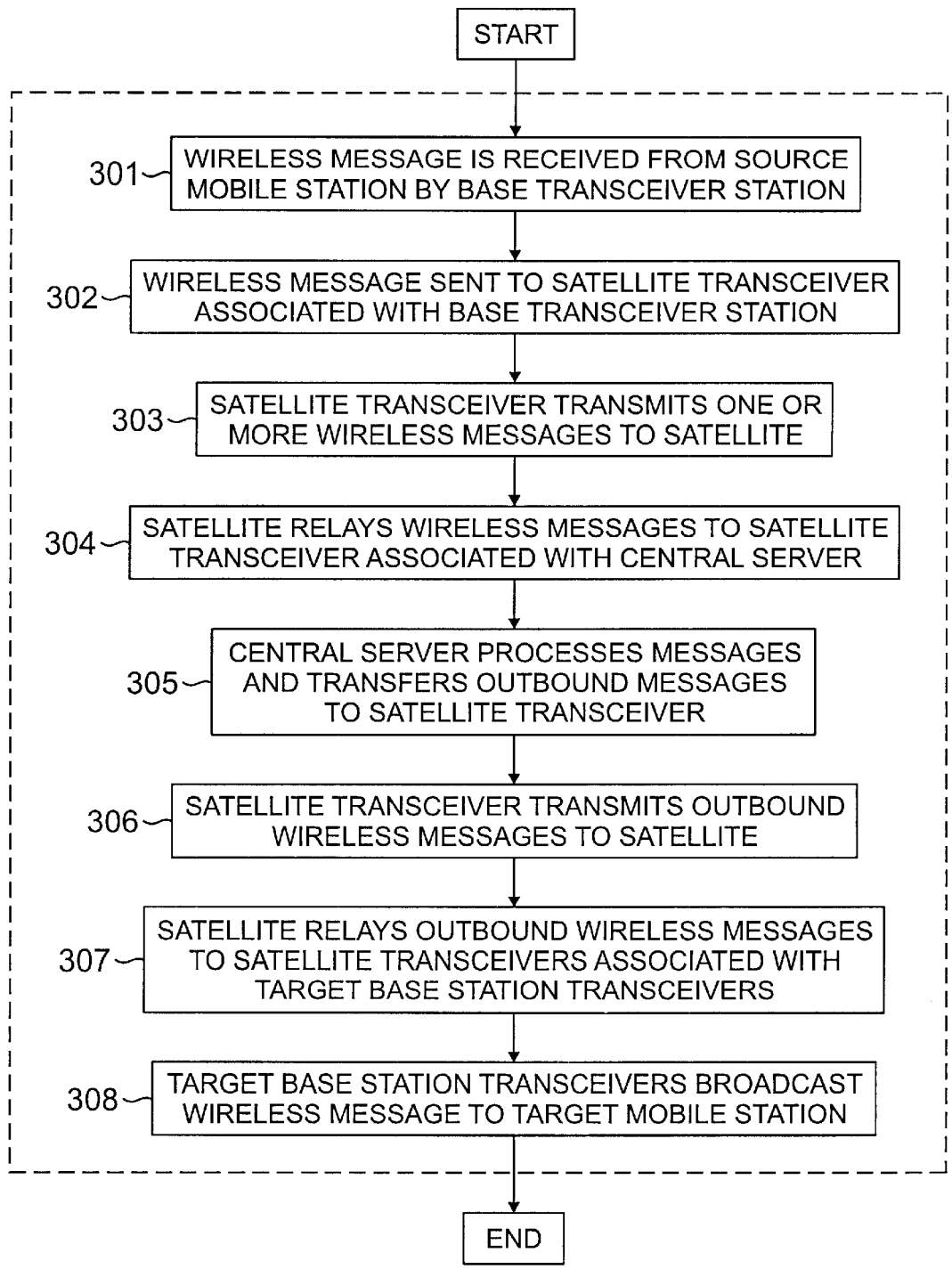
FIG. 3 is a flow diagram illustrating the operation of the exemplary wireless network in FIG. 1 according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless messaging network.

FIG. 1 illustrates an exemplary wireless messaging network 100 according to one embodiment of the present invention. Wireless messaging network 100 comprises groups of base transceiver stations, groups of satellite transceiver stations, and a wireless messaging hub that form a nationwide infrastructure used by a wireless messaging service provider. The base transceiver stations receive wireless messages and relay them to the wireless messaging hub by means of the satellite transceiver stations, thereby eliminating the need for long-distance wireline connections.

Base transceiver station 101 and base transceiver station 102 operate in regional service area 110, which may be, for example, Seattle, Wash. Base transceiver stations 101 and 102 are coupled to common satellite transceiver 105 via wireline 106. In an advantageous embodiment of the present invention, wireline 106 is a local network or local telephone line, so that wireless messages received by base transceiver station 101 and base transceiver station 102 may be relayed to satellite transceiver 105 without using long distance lines.

Although base transceiver station 101 and base transceiver station 102 are shown sharing satellite transceiver 105, in an advantageous embodiment of the present invention, base transceiver station 101 and base transceiver station 102 each may be coupled to individual satellite transceivers located at the base transceiver station. In such an embodiment, wireline 106 may be eliminated.

Base transceiver stations 111 and base transceiver station 112 operate in regional service area 120, which may be, for example, New York City. Base transceiver stations 111 and 112 are coupled to common satellite transceiver 115 via wireline 116. As before, in an advantageous embodiment of the present invention, wireline 116 is a local network or local telephone line, so that wireless messages received by base transceiver station 111 and base transceiver station 112 may be relayed to satellite transceiver 115 without using long distance lines.

Although base transceiver station 111 and base transceiver station 112 are shown sharing satellite transceiver 115, in an advantageous embodiment of the present invention, base transceiver station 111 and base transceiver station 112 each may be coupled to individual satellite transceivers located at the base transceiver station. In such an embodiment, wireline 116 may be eliminated. Additionally, in an advantageous embodiment of the present invention, base transceiver stations 111 and 112 each may be coupled to separate satellite transceivers or to a common satellite transceiver by means of a wireless link, such as a spread spectrum radio link or the like.

Satellite transceiver 105 receives wireless messages from base transceiver stations 101 and 102 and transmits the wireless messages according to an established protocol to satellite 160. Each of base transceiver stations 101 and 102 receive wireless messages from mobile stations 121, 122 and 123. Base transceiver stations 101 and 102 also transmit wireless messages to mobile stations 121, 122 and 123.

Similarly, satellite transceiver 115 receives wireless messages from base transceiver stations 111 and 112 and transmits the wireless messages according to an established protocol to satellite 160. Each of base transceiver stations 111 and 112 receive wireless messages from mobile stations 131, 132 and 133. Base transceiver stations 111 and 112 also transmit wireless messages to mobile stations 131, 132 and 133.

Mobile stations 121–123 and mobile stations 131–133 comprise a wide variety of two-way wireless messaging devices. For example, one or more of mobile stations 121–123 and mobile stations 131–133 may comprise a two-way text message pager carried by subscriber or a two-way paging terminal embedded in another electronic apparatus, such a personal computer (PC) or a hand-held personal digital assistant (PDA) device, such as a PALMPILOT™ device. In another embodiment, one or more of mobile stations 121–123 and mobile stations 131–133 may comprise a telemetry paging device used to transfer data measured or recorded in different types of remotely disposed equipment, such as vending machines, vehicles, oil wells, pipelines, etc. In still another embodiment of the present invention, one or more of mobile stations 121–123 and mobile stations 131–133 may comprise a personal communications services (PCS) device capable of sending and receiving alphanumeric text messages and/or relatively short voice messages. In general, the content of the wireless messages could be any binary encoded content, including e-mail, documents, graphics, voice, video, or the like.

Central server 150 is the message routing hub for all of wireless messaging network 100. Any wireless message transmitted by one of mobile stations 121–123 in regional service area 110 is received in a "reverse" channel by one of base transceiver stations 101 or 102 and is relayed by satellite transceiver 105 to satellite 160. Similarly, any wireless message transmitted by one of mobile stations 131–133 in regional service area 120 is received in a "reverse" channel by one of base transceiver stations 111 or 112 and is relayed by satellite transceiver 115 to satellite 160.

Satellite 160 retransmits the wireless messages received from satellite transceivers 105 and 115 to satellite transceiver 140 on the ground. If central server 150 is located remotely from satellite transceiver 140, satellite transceiver 140 may be coupled to central server 150 via wireline 145. As will be explained below in greater detail, central server 150 receives and sorts incoming wireless messages from satellite 160 and groups together wireless messages that are being sent to target mobile stations located in the same regional service area. Central server 150 then retransmits the reformatted packets of wireless messages back to satellite 160 via satellite transceiver 140. Next, satellite 160 transmits the packets of wireless messages to the base transceiver stations in the target regional service area. Finally, the base transceiver stations in the target service area transmit the wireless messages in a "forward" channel to the mobile stations in the target regional service area.

Not all messages handled by wireless messaging network 100 originate from a wireless device. Many messages will originate from wireline devices, such as numeric telephone pages or e-mail transmitted from a PC. To accommodate these messages, wireless messaging network 100 contains numerous interfaces to the central office exchanges of the public switched telephone network (PSTN) and to the public Internet.

For example, in regional service area 110, locally generated wireless messages are received from PSTN interface 125 and in regional service area 120, locally generated wireless messages are received from PSTN interface 135. The messages received from PSTN interfaces 125 and 135 then may be transmitted via satellite transceivers 105 and 115 to satellite transceiver 140 and central server 150 without using long-distance lines. Furthermore, central server 150 may also receive messages directly from PSTN interface 155.

To facilitate the handling of locally generated wireless messages received from PSTN interfaces 125 and 135, regional service areas 110 and 120 may further comprise interactive voice response interface (IVR IF) 126 and interactive voice response interface (IVR IF) 136, respectively. A caller who wishes to send a numeric message, an alphanumeric message, or a voice message to a subscriber calls into an interactive voice response interface in the caller's local area and interacts with the interactive voice response interface by means of a series of voice message prompts, DTMF key pad entries, spoken responses, etc.

For example, if mobile station (MS) 131 is a message paging unit and a caller in regional service area 110 dials the subscriber telephone number corresponding to MS 131, the caller is automatically connected to IVR IF 126, which may play to the caller a system voice greeting message, or a voice greeting message recorded by the subscriber. The voice greeting message typically prompts the caller to enter the caller's telephone number using the telephone keypad. IVR IF 126 then stores the caller's telephone number and formats it in a wireless message that is suitable for transmission to central server 150 via satellite 160, as described below in greater detail.

Alternatively, the caller may be prompted to leave a voice message by IVR IF 126, which records the caller's voice. IVR IF 126 may then send a short message to the subscriber indicating that the subscriber has received a voice message. The subscriber then has the option of calling into IVR IF 126 to retrieve the stored voice message. IVR IF 126 also may use any one of a number of well-known voice compression algorithms to convert the caller's stored voice message to digital data that may be incorporated into one or more wireless messages that are suitable for transmission to central server 150.

In still other embodiments of the present invention, IVR IF 126 may comprise modems devices that enable IVR IF 126 to interact with a processing device, such as a personal computer, in order to receive and reformat alphanumeric messages, such as e-mail, graphics files, video files, audio files, or the like. These files/messages may then be transmitted to central server 150. In sum, IVR IF 126, IVR IF 136 and other regionally located interactive voice response interfaces enable wireless messaging network 100 to receive data messages in a variety of different formats from the public switched telephone network over local lines in the different regional service areas. These data messages are then re-formatted for transmission to central server 150 and, ultimately, delivery to the wireless messaging unit of the targeted subscriber.

The operation of wireless messaging network 100 may be better understood by means of illustrative example. A subscriber originates a wireless message using mobile station 121, which is a two-way numeric pager. The wireless message is to be sent to mobile station 131, which also is a two-way numeric pager. The wireless message is received in a reverse channel by base transceiver station 101 and is sent to satellite transceiver 105. Satellite transceiver 105 transmits the wireless message (and other messages perhaps) on an uplink connection to satellite 160. Satellite 160 relays the wireless message(s) on a downlink connection to satellite transceiver 140. Satellite transceiver 140 then transfers the wireless message(s) to central server 150.

Central server 150 then determines that the target mobile station 131 is located in regional service area 120. Central server 150 then adds the wireless message to a larger frame of wireless messages destined for regional service area 120 and sends the message frame to satellite transceiver 140. Satellite transceiver 140 then transmits the frame to satellite 160, which re-transmits the frame to satellite transceiver 115. The wireless message is then broadcast in a forward channel by base transceiver stations 111 and 112 and is received by mobile station 131.

In the above-described embodiment of the present invention, satellite 160 gathers all "inbound" wireless messages from all base transceiver stations and sends them to central server 150. Satellite 160 also receives all "outbound" messages from central server 150 and distributes them to the base transceiver stations. However, this is by way of illustration only, and it will be understood by those skilled in the art that more than one satellite may be used to operate wireless messaging network 100. For example, perhaps one or more other satellites may be used to gather the inbound wireless messages from all of the source base transceiver stations, while one or more other satellites may be used to distribute the outbound wireless messages to the destination base transceiver stations.

In an advantageous embodiment of the present invention, satellite 160 (and any other satellite used by wireless messaging network 100) is in a geosynchronous orbit, such that satellite 160 is located at a fixed point in the sky with respect to the satellite transceivers 105, 115, and 140. In alternate embodiments of the present invention, satellite 160 may comprise combinations of any one or more of the following: low-earth orbit satellite(s), plane(s) flying at high altitude above a defined coverage area, high-altitude balloon(s) or blimp(s), and the like. In sum, the term "satellite" in this disclosure may include any type of airborne system that can wirelessly relay messages across comparatively large distances to and from central server 150.

Satellite transceivers 105, 115, and 140 may communicate with satellite 160 by means of any conventional protocol, such as frequency division multiple access (FDMA), time division multiple access (TDMA), code division multiple access (CDMA), or the like. Similarly, base transceiver stations 101, 102, 111, and 112 may communicate with mobile stations 121–123 and 131–133 by means of one or more conventional protocols, such as frequency division multiple access (FDMA), time division multiple access (TDMA), code division multiple access (CDMA), or the like. In an advantageous embodiment of the present invention, mobile stations 121–123 and 131–133 and base transceiver stations 101, 102, 111, and 112 communicate using a TDMA protocol in the narrowband PCS spectrum, such as REFLEX25™ protocol developed by Motorola, Inc.

FIG. 2 illustrates central server 150 according to one embodiment of the present invention. Central server 150 comprises message processor 205, memory 210, satellite uplink interface 220, satellite downlink interface 230, and data bus 240. Memory 210 contains the operating program executed by message processor 205 and a plurality of data structures, including inbound queues 211, outbound queues 212 and target look-up table 213.

Wireless messages are received from satellite transceiver 140 by satellite downlink interface 230 and are stored in memory 210 in inbound queues 211. Message processor 205 parses each of the wireless messages in inbound queues 211 and examines the destination address in each message header to determine the target mobile station to the wireless message is directed. Message processor 205 uses the address of the target mobile station to search target look-up table 213 in order to determine the target regional service area in which the target mobile station is currently located. Message processor 205 also identifies the base transceiver station(s) in the target regional service area.

All wireless messages that are being sent to mobile stations in the same target regional service area are then packed together in the same larger transmission frame in outbound queues 212. Message processor attaches to each such transmission frame address and header information fields that enable the base transceiver stations in the target regional service areas to identify wireless messages that are being sent to them. The transmission frames in the outbound queues 212 are then sent to satellite uplink interface 220, which transfers the transmission frames to satellite transceiver 140 for subsequent transmission to satellite 160.

FIG. 3 is a flow diagram 300 illustrating the operation of the exemplary wireless network 100 according to one embodiment of the present invention. Flow diagram 300 outlines the processing of a wireless message from source mobile station 121 to target mobile station 131. Initially, a wireless message is received in the reverse channel from source mobile station 121 by base transceiver station 101 (process step 301). The received wireless message (and possibly other messages) are sent to satellite transceiver 105 associated with base transceiver station 101 (process step 302). Satellite transceiver 105 transmits the wireless message(s) in a larger transmission frame to satellite 160, including wireless messages from other base transceiver stations, if any, served by satellite transceiver 105 (process step 303).

Next, satellite 160 relays the received transmission frame to satellite transceiver 140 associated with central server 150 (process step 304). Central server 150 processes the wireless messages in the received transmission frame and transfers to satellite transceiver 140 outbound transmission frames containing reformatted wireless messages (process step 305). Satellite transceiver 140 then transmits the outbound wireless messages to satellite 160 (process step 306).

Satellite 160 relays the received outbound wireless messages to satellite transceiver 115, which is associated with target base transceiver station 111 and target base transceiver station 112 (process step 307). Target base transceiver station 111 and target base transceiver station 112 then simultaneously broadcast (i.e., simulcast) the original wireless message to target mobile station 131 (process step 308).

Although the principles of the present invention have been described in detail with reference to message paging system and infrastructure embodiments, those of ordinary skill in the art should understand that they can make various changes, substitutions and alterations herein without departing from the spirit and scope of the invention in its broadest form.

What is claimed is:

1. For use in a wireless messaging system, an inbound message receiving system comprising:

a source base transceiver station for receiving a wireless message from a source mobile station disposed in a coverage area of said base transceiver station;

a first satellite transceiver coupled to said base transceiver station for transmitting said wireless message to a satellite;

a local communication link for coupling said source base transceiver station to said first satellite transceiver and transferring said wireless message, wherein said local communication link does not include a portion that is part of a long-distance network subject to long-distance fees; and a message server for receiving from said satellite said wireless message and processing said wireless message and determining therefrom at least one target base transceiver station associated with a target mobile station to which said wireless message is directed.

2. The inbound message receiving system as set forth in claim 1 wherein said satellite is a geosynchronous satellite.

3. The inbound message receiving system as set forth in claim 2 further comprising a second satellite transceiver for receiving from said satellite said wireless message and for forwarding said wireless message to said target mobile station through said target base transceiver.

4. The inbound message receiving system as set forth in claim 1 wherein said mobile station is an alphanumeric paging device.

5. The inbound message receiving system as set forth in claim 1 wherein said mobile station is a telemetry device operable to perform two-way paging.

6. The inbound message receiving system as set forth in claim 1 wherein said source mobile station communicates with said source base transceiver station by means of a time division multiple access (TDMA) protocol operating in a narrowband PCS spectrum.

7. The inbound message receiving system as set forth in claim 1 wherein said source base transceiver station is coupled to an interface for receiving wireless messages from a wireline connection to a public switched telephone network.

8. A wireless messaging infrastructure comprising:
a plurality of base transceiver stations for receiving wireless messages from a plurality of source mobile stations disposed in coverage area of said plurality of base transceiver stations;
a plurality of satellite transceivers, each of said plurality of satellite transceivers coupled to at least one of said base transceiver stations and capable of transmitting said wireless messages to a satellite;
at least one local communication link for coupling at least one of said plurality of source base transceiver stations to at least one of said plurality of satellite transceivers and transferring said wireless messages, wherein said at least one local communication link does not include a portion that is part of a long-distance network subject to long-distance fees; and
a message server for receiving said wireless messages from said satellite and determining for each of said wireless messages at least one target base transceiver station associated with a target mobile station to which said each wireless message is directed.

9. The wireless messaging infrastructure as set forth in claim 8 wherein said satellite is a geosynchronous satellite.

10. The wireless messaging infrastructure as set forth in claim 8 further comprising a central satellite transceiver coupled to said message server for receiving from said satellite said wireless messages.

11. The wireless messaging infrastructure as set forth in claim 8 wherein said mobile station is an alphanumeric paging device.

12. The wireless messaging infrastructure as set forth in claim 8 wherein said mobile station is a telemetry device operable to perform two-way paging.

13. The wireless messaging infrastructure as set forth in claim 8 wherein said plurality of source mobile stations communicate with said plurality of source base transceiver stations by means of a time division multiple access (TDMA) protocol.

14. The wireless messaging infrastructure as set forth in claim 8 wherein said plurality of source mobile stations and said plurality of source base transceiver stations operate in a narrowband PCS spectrum.

15. The wireless messaging infrastructure as set forth in claim 8 wherein each of said plurality of source base transceiver stations is coupled to an interface for receiving wireless messages from a wireline connection to a public switched telephone network.

16. For use in a wireless messaging infrastructure comprising a message server and a plurality of base transceiver stations for receiving wireless messages, a method of processing an inbound wireless message comprising the steps of:
receiving the wireless message in a selected one of the plurality of base transceiver stations from a source mobile station;
transmitting the wireless message from the selected base transceiver station to a first satellite transceiver via a local communication link coupling said source base transceiver station to said first satellite transceiver, wherein said local communication link does not include a portion that is part of a long-distance network subject to long-distance fees; and
transmitting the wireless message from the first satellite transceiver to the message server via an inbound satellite link.

17. The method as set forth in claim 16 including the further step of transmitting the wireless message from the message server to a target base transceiver station via an outbound satellite link.

18. For use in a wireless messaging system, an outbound message transmitting system comprising:
a target base transceiver station for transmitting a wireless message to a target mobile station disposed in a coverage area of said target base transceiver station;
a first satellite transceiver coupled to said target base transceiver station for receiving said wireless message from a satellite;
a local communication link for coupling said target base transceiver station to said first satellite transceiver and transferring said wireless message, wherein said local communication link does not include a portion that is part of a long-distance network subject to long-distance fees; and
a message server for transmitting to said satellite said wireless message and processing said wireless message and determining therefrom said target base transceiver station associated with said target mobile station to which said wireless message is directed.

19. The outbound message transmitting system as set forth in claim 18 wherein said target mobile station is an alphanumeric paging device.

20. The outbound message transmitting system as set forth in claim 18 wherein said target mobile station is a telemetry device operable to perform two-way paging.

* * * * *